_United States Patent Office_

3,525,756
Patented Aug. 25, 1970

3,525,756
HERBICIDAL HEXACHLOROCYCLO-
HEXADIENONE DERIVATIVES
John J. Krajewski, Wheeling, Ill., assignor to International Minerals and Chemical Corporation, a corporation of New York
No Drawing. Filed July 1, 1966, Ser. No. 562,135
Int. Cl. C07c 97/08
U.S. Cl. 260—396        3 Claims This invention relates to hexachlorocyclohexadienone derivatives. More particularly, this invention relates to trialkylammoniumpentachlorocyclohexadienone chlorides, the preparation thereof, and the use of the same and secondary amine-hexachlorocyclohexadienone reaction products as herbicides.

British Pat. No. 716,020 discloses the preparation of fungicidal derivatives of cyclohexadienone by the reaction of a primary or secondary amine with hexachlorocyclohexadienone. The primary and secondary amines which are used in the preparation of the fungicides may contain substituents such as amino, hydroxyl, carboxy and cyano.

Somewhat related compounds are known in the art to exhibit herbicidal activity. For example, U.S. Pat. No. 2,657,126 discloses that compounds identified as polyhalocyclohexenones containing six to eight halogen atoms attached to the cyclohexenone nucleus are useful as herbicides. Hexachlorocyclopentadiene is disclosed in U.S. Pat. No. 3,007,788 as being effective for killing aquatic plants.

This invention is based on the discovery that certain derivatives of hexachlorocyclohexadienone are useful as herbicides. More particularly, the herbicidal derivatives are dialkylaminopentachlorocyclohexadienones, dialkanolaminopentachlorocyclohexadienones and N-alkylalkanolaminopentachlorocyclohexadienones which are obtained by reaction of hexachlorocyclohexadienone with dialkylamines, dialkanolamines and N-alkylalkanolamines, respectively, as described in British Pat. No. 716,020, and trialkylammoniumpentachlorocyclohexadienone chlorides, which are obtained from hexachlorocyclohexadienone by reaction with a tertiary alkylamine in accordance with this invention. These four groups of herbicidal derivatives of hexachlorocyclohexadienone are hereinafter collectively referred to as "the herbicides of this invention."

It is, therefore, an object of this invention to provide new hexachlorocyclohexadienone derivatives, and a method for the the preparation of the same.

Another object of this invention is to provide trialkylammoniumpentahalocyclohexadienone halides and a method for the preparation of the same.

Still another object of this invention is to provide trialkylammoniumpentachlorohexadienone chlorides and a method for the preparation of the same.

Still another object of this invention is to provide 4-trialkylammoniumpentachlorohexa-2,5-diene-1-one chlorides and a method for the preparation of the same.

A further object of this invention is to provide new herbicides.

A still further object of this invention is to provide compounds which are useful as herbicides.

These and further objects of this invention will become apparent or be described as the description thereof herein proceeds.

In accordance with this invention, hexachlorocyclohexa-2,5-diene-1-one is reacted with a tertiary alkylamine to produce the present novel 4-trialkylammoniumpentachlorocyclohexa-2,5-diene-1-one chlorides, as illustrated by the following equation:

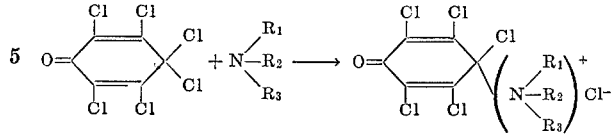

where $R_1$, $R_2$ and $R_3$, which may be the same or different, represent alkyl radicals. The radicals $R_1$, $R_2$ and $R_3$ preferably contain a total of 3 to 15 carbon atoms, with a total of 3 carbon atoms being especially preferred. The following amines are typical of the tertiary amines which may be employed in preparing the novel compounds of this invention: trimethylamine, triethylamine, tripropylamine, triisopropylamine, triisobutylamine, N-methyldiethylamine, N-propyldiethylamine, N-methyldiisopropylamine, N-ethyldiisopropylamine, N-propyldiisopropylamine, N - methyl - N-propyl-N-isopropylamine, and the like.

Examples of such new compounds derived from hexachlorocyclohexadienone in accordance with this invention are 4-trimethylammoniumpentachlorocyclohexa-2,5-diene-1-one chloride, 4-triethylammoniumpentachlorocyclohexa-2,5-diene-1-one chloride, 4-tripropylammoniumpentachlorocyclohexa - 2,5 - diene-1-one chloride, 4-triisopropylammoniumpentachlorocyclohexa - 2,5 - diene-1-one chloride, 4-triisobutylammoniumpentachlorocyclohexa-2,-5-diene-1-one chloride, 4-N-methyldiethylammoniumpentachlorocyclohexa-2,5-diene-1-one chloride, 4-N-ethyldiisobutylammoniumpentachlorocyclohexa - 2,5-diene-1-one chloride, 4-N-methyl-N-ethyl-propylammoniumpentachlorocyclohexa-2,5-diene-1-one chloride, and N-ethyl-N-isopropylisobutylammoniumpentachlorocyclohexa-2,5-diene-1-one chloride.

A wide variety of reaction procedures and conditions may be used in preparing the trialkylammoniumpentachlorocyclohexa-2,5-diene-1-one chlorides in accordance with this invention. The reaction is carried out by mixing the reactants, preferably in an inert solvent, as by dispersing one of the reactants in a suitable solvent and then adding the other reactant, either as such, or in solution in the same solvent or in solution in a different solvent which is miscible with the first solvent.

The specific nature and amount of the solvent used is not critical and any solvent may be used so long as it is substantially inert under the reaction conditions, that is, substantially non-reactive with either of the reactants or the desired product. Specific solvents which are useful in the process of this invention include benzene, toluene, pentanes, hexanes, and other liquid saturated aliphatic or aromatic hydrocarbons. Liquid alcohols are also substantially inert under the preferred reaction conditions and, accordingly, another class of useful solvents are alcohols such as methyl alcohol, ethyl alcohol, propyl alcohol, isopropyl alcohol, and the various butyl alcohols, amyl alcohols, hexyl alcohols, heptyl alcohols, and octyl alcohols; cyclohexyl alcohol, benzyl alcohol and other cyclic alcohols; and substituted derivatives of any of the above alcohols, as for example, in case of ethanol, ethylene glycol, beta-ethoxy ethanol, diethylene glycol monoethyl ether, and the like. It is thus seen that the alcohols useful as solvents in this invention may be aliphatic, alicyclic or aromatic, saturated or unsaturated, primary, secondary or tertiary, and substituted or unsubstituted. Other solvents which are useful in carrying out the reaction of this invention include ethers, such as ethyl ether, isopropyl ether, butyl ether, and glycol diethers, as for example, 1,4-dioxane, diether Carbitol and dibutyl Carbitol.

In general, the quantities of the reactants are not critical and may be varied widely. However, it is generally preferred to use such equimolecular proportions for the purpose of economy.

The temperature and pressure at which the reactions of this invention are conducted may be varied considerably. Satisfactory yields are obtained when atmospheric pressure and temperatures of about 0° to 100° C. are used, but temperatures within the range of about 25° to 50° C. are preferred. However, other temperatures and pressures may also be used. The reaction products are recovered from the reaction media, i.e., the inert solvents, by usual methods. For example, a product may be recovered from a solvent by evaporation of the solvent.

The following example is illustrative of the reaction of this invention.

EXAMPLE I

A solution of 30 grams (0.1 mole) of hexachlorocyclohexa-2,5-diene-1-one in 300 ml. of 95% ethanol was saturated with trimethylamine and stored at room temperature in two stoppered and wired pressure bottles. After two days the resulting solution was evaporated to dryness to obtain a solid material, which was washed with water and air dried to yield 25 grams (75% yield) of crude 4 - trimethylammoniumpentachlorocyclohexa-2,5-diene-1-one chloride melting at 143.5° to 167.5° C. Upon recrystallization three times from 50% ethanol-water, a product having a melting point of 229.5° to 230.5° C. was obtained.

*Analysis.*—Calculated for $C_9H_9Cl_6NO$ (percent): C, 30.0; H, 2.5; Cl, 59.2; N, 3.89. Found (percent): C, 30.87; H, 2.63; Cl, 58.06; N, 4.29.

The other herbicides of this invention, that is, 4-dialkylaminopentachlorocyclohexa-2,5-diene-1-ones, 4-dialkanolaminopentachlorocyclohexa-2,5-diene-1-ones, and 4-N-alkylalkanolaminopentachlorocyclohexa-2,5-diene-1-ones, are prepared in accordance with the process disclosed in British Pat. No. 716,020 by reacting hexachlorocyclohexa-2,5-diene-1-one with a secondary amine, as illustrated by the following equation:

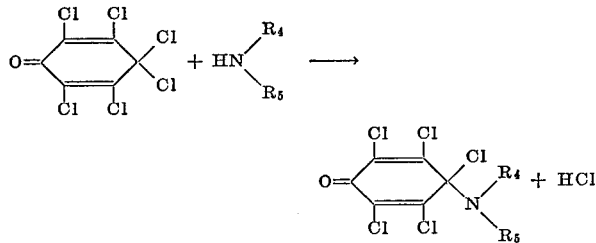

where $R_4$ and $R_5$, which may be the same or different, represent alkyl and hydroxyalkyl radicals. The preferred compounds are those when the radicals $R_4$ and $R_5$ are both alkyl or hydroxyalkyl radicals. The radicals $R_4$ and $R_5$ will preferably contain a total of 2 to 12 carbon atoms, and most preferably a total of 2 to 8 carbon atoms.

Illustrative of the secondary amines which are useful in the above reaction are dimethylamine, diethylamine, dipropylamine, diisopropylamine, dibutylamine, diamylamine, N-methylethylamine, N-methylbutylamine, N-ethylbutylamine, diethanolamine, diisopropanolamine, N-butanolethanolamine, N-butylethanolamine, and N-methylbutanolamine, and the like. It will thus be seen that dialkylamines, dialkanolamines and N-alkylalkanolamines are all useful. The specific type of hexachlorocyclohexadienone derivative produced will, of course, depend upon the specific type of secondary amine used. Therefore, a dialkylamine will result in the production of the corresponding 4 - dialkylaminopentachlorocyclohexa-2,5-diene-1-one, a 4-dialkanolaminopentachlorocyclohexa-2,5-diene-1-one will be obtained when a dialkanolamine is used, and an N-alkylalkanolamine will produce a 4-N-alkylalkanolaminopentachlorocyclohexa-2,5-diene-1-one.

Examples of hexachlorocyclohexadienone derivatives obtained by the use of secondary amines are:

4-dimethylaminopentachlorocyclohexa-2,5-diene-1-one,
4-diisopropylaminopentachlorocyclohexa-2,5-diene-1-one,
4-N-ethylbutylaminopentachlorocyclohexa-2,5-diene-1-one,
4-diethanolaminopentachlorocyclohexa-2,5-diene-1-one,
4-diisopropanolaminopentachlorocyclohexa-2,5-diene-1-one,
4-N-methylethanolaminopentachlorocyclohexa-2,5-diene-1-one, and
4-N-butylethanolaminopentachlorocyclohexa-2,5-diene-1-one.

The following examples illustrate the preparation of herbicides of this invention by reacting a secondary amine with hexachlorocyclohexa-2,5-diene-1-one as disclosed in British Pat. No. 716,020.

EXAMPLE II

The compound 4-dibutylaminopentachlorocyclohexa-2,5-diene-1-one was prepared by adding 25.8 grams (0.2 mole) of dibutylamine with a dropping funnel to a solution of 30.0 grams (0.1 mole) of hexachlorocyclohexa-2,5-diene-1-one in 200 ml. of ether. The resulting mixture was refluxed gently for an hour, and reduced to dryness by vacuum distillation. Treatment of the resulting residue with 200 ml. of water, filtration and air drying with suction afforded 35 grams (89.2% yield) of crude product melting at 145°–161° C. Crystallization from cyclohexane and recrystallization from petroleum ether (80°–110° C.) yielded white crystals melting at 163°–165° C.

*Analysis.*—Calculated for $C_{14}H_{18}Cl_5NO$ (percent): Cl, 43.3; N, 3.57. Found (percent): Cl, 43.9; N, 3.41.

EXAMPLE III

The compound 4-diethanolaminopentachlorocyclohexa-2,5-diene-1-one was prepared by adding with a dropping funnel 21 grams (0.2 mole) of diethanolamine to a stirred, heated suspension of 30 grams (0.1 mole) of hexachlorocyclohexa-2,5-diene-1-one in 140 ml. of diethyl ether. Upon completion of the addition, the resulting mixture was stirred and refluxed for one hour. The product was isolated by vacuum distillation of the ether, washing the residue with 200 ml. of distilled water and filtration with suction. A total yield of crude product of 30.2 grams (81.8% yield) was obtained. Crystallization twice from ethyl acetate afforded buff colored crystals melting at 184°–185.5° C. and having the following analysis: Calculated for $C_{10}H_{10}Cl_5NO_3$ (percent): Cl, 48.1; OH, 9.22; N, 3.8. Found (percent): Cl, 46.8; OH, 9.17; N, 3.97.

EXAMPLE IV

When N-methylethanolamine is reacted with hexachlorocyclohexa-2,5-diene-1-one in accordance with the procedure of Example II, 4-N-methylethanolaminopentachlorocyclohexa-2,5-diene-1-one is obtained.

The herbicides of this invention are used for the control of undesirable vegetation by applying a herbicidally effective amount of at least one of the compounds to a locus to be protected from the undesirable vegetation. Thus, the herbicides of this invention may be used to control undesirable plant life by post-emergent application to kill growing plants, or by pre-emergent application to prevent the growth of undesirable plants, e.g., to kill seeds of germinating undesirable plants. The 4-trialkylammoniumpentachlorocyclohexa-2,5-diene-1-one chlorides of this invention are the preferred herbcides of this invention for pre-emergent application since they are the most effective of the herbicides of this invention for this use.

The amount of the herbicides of this invention applied will vary depending upon factors, such as the method of application, the number of applications, the herbicidal activity of the specific compound being used, the specific plant which is to be destroyed, and the like. The amount of herbicide used will also depend upon the degree of control desired, i.e., the selective control of undesirable vegetation in various crops or the complete control of vegetation. An application rate of about 2 to 25 pounds per acre will generally be used to obtain a selective herbicidal effect when the herbicides of this invention are used for post-emergent application to kill undesirable broad leaf plants without harm to narrow leaf plants or for pre-emergent application to prevent the growth of undesirable broad leaf plants among narrow leaf plants. However, application rates greater than about 25 pounds per acre, e.g., up to about 50 pounds per acre, will generally be used to obtain complete control of both broad leaf and narrow leaf plants, either by pre-emergent or post-emergent application.

The herbicides of this invention are applied in solutions, dispersions or emulsions in a suitable inert liquid medium. It is preferred that water be used for purposes of economy and convenience. Aqueous dispersions containing the herbicides of this invention can be prepared by dissolving at least one of the herbicides in a water-miscible inert organic solvent to form a concentrated solution which is then mixed with a much larger volume of water to form a dispersion of the desired concentration. As used herein, the term "dispersion", as used with respect to a liquid dispersion of the herbicides of this invention, is intended to include true solutions, colloidal dispersions and emulsions.

If desired, a wetting or dispersing agent may be included in the dispersions of the herbicides of this invention to provide efficient wetting of the plants. Any suitable wetting agent that has the property of lowering the inter-facial tension between the dispersion and the plants may be used provided that it is not reactive with the specific herbicide of this invention with which it is used in combination. Representative wetting agents include alkali metal salts of long chain aliphatic sulfates and alkylaryl sulfonates, wholly or partially neutralized sulfuric acid derivatives of petroleum oil, polyoxyalkylene derivatives of phenols and fatty acids and the like.

In applying the herbicides of this invention in a dispersion to plants, the dispersion is usually sprayed on the plants in a sufficient quantity so that all of the plant leaves are fully wetted. However, it will be evident that other methods of application can also be used. For example, dispersions of lower concentrations may be used if more than one application is used, but the total quantity applied should approximate at least that achieved by the effective concentration level for a single application.

It will also be evident that the herbicides of this invention can be applied in the form of a powder dispersed in an inert carrier powder, which is applied to soils or plants by dusting. For example, the herbicides of this invention may be mechanically mixed or ground with an inert solid diluent, such as talc, mica, clays, and the like. Alternatively, the herbicides of this invention may be dissolved in a suitable solvent, e.g., ethanol, which is then mixed with the solid diluent and evaporated during or after the mixing operation. This method of application, however, is not as convenient as the use of a dispersion which is sprayed on soils or plants.

The herbicidal effect of the herbicides of this invention is shown in the following examples.

EXAMPLE V

In this experiment, the effects of post-emergent application of three herbicides of this invention were determined. Aqueous solutions of different concentrations were prepared for each of the three herbicides. The solutions also contained the dispersing agent which is sold under the trademark Triton X–100. A plurality of flats containing growing plants were each treated with one of the herbicidal solutions by spraying the plants to run-off. All of the flats contained three types of broad leaf plants (turnip, buckwheat, and aster) and three types of narrow leaf plants, i.e., grasses (millet, perennial rye and sorghum), having at least their first true leaves. The treated flats and some control flats which were not so sprayed were placed in a greenhouse for about two weeks and the sprayed flats were then rated as indicated in Table I as follows:

TABLE I.—POST-EMERGENT HERBICIDAL TEST RESULTS

| Compound | Concentration, equivalent to lbs./acre | Rating[1] | | | | | |
| --- | --- | --- | --- | --- | --- | --- | --- |
| | | Millet | Ryegrass | Sorghum | Aster | Buckwheat | Turnip |
| 4-trimethylammoniumpenta-chlorocyclohexa-2,5-diene-1-one chloride. | 20 | 3 | 3 | 3 | 5 | 5 | 5 |
| | 20 | 2 | 2 | 2 | 5 | 5 | 5 |
| | 10 | 2 | 2 | 2 | 5 | 4 | 4 |
| | 5 | 2 | 2 | 2 | 5 | 5 | 5 |
| 4-diethanolaminopenta-chlorocyclohexa-2,5-diene-1-one. | 20 | 4 | 3 | 5 | 5 | 5 | 5 |
| | 10 | 4 | 1 | 4 | 5 | 5 | 5 |
| | 5 | 2 | 2 | 2 | 5 | 5 | 5 |
| | 2.5 | 2 | 2 | 2 | 3 | 3 | 3 |
| 4-dibutylaminopentachloro-cyclohexa-2,5-diene-1-one. | 20 | 3 | 4 | 4 | 5 | 5 | 5 |
| | 10 | 1 | 1 | 1 | 3 | 3 | 3 |
| | 5 | 1 | 1 | 1 | 2 | 2 | 2 |

Rating Key: 1=no injury or normal stand; 2=slight injury or slight reduction in stand; 3=moderate injury or moderate reduction in stand; 4=severe injury or severe reduction in stand; 5=all plants killed or no stand.

EXAMPLE VI

The effect of pre-emergent application of 4-trimethylammoniumpentachlorocyclohexa-2,5-diene-1-one chloride was determined in this experiment by spraying aqueous solutions of different concentrations of the same on flats seeded with turnip, buckwheat, aster, millet, perennial ryegrass and sorghum, the spraying being done before the plants began to grow. The sprayed flats were placed in a greenhouse for about two weeks with similar control flats and the flats were then rated as indicated in Table II as follows:

TABLE II.—PRE-EMERGENT HERBICIDAL TEST RESULTS

| Compound | Concentration, equivalent to lbs./acre | Rating[1] | | | | | |
| --- | --- | --- | --- | --- | --- | --- | --- |
| | | Millet | Ryegrass | Sorghum | Aster | Buckwheat | Turnip |
| 4-trimethylammoniumpenta-chlorocyclohexa-2,5-diene-1-one chloride. | 20 | 2 | 1 | 1 | 4 | 4 | 4 |
| | 20 | 2 | 2 | 1 | 3 | 3 | 3 |
| | 10 | 1 | 1 | 1 | 3 | 2 | 2 |
| | 5 | 1 | 1 | 1 | 2 | 1 | 2 |

Rating Key: 1=normal stand; 2=slight reduction in stand; 3=moderate reduction in stand; 4=severe reduction in stand; 5=no stand.

EXAMPLE VII

This experiment was conducted to compare the effectiveness of the herbicides of this invention with another of the compounds broadly disclosed by British Pat. No. 716,020, namely, 4-N-morpholinopentachlorocyclohexa-2,5-diene-1-one which has the structure:

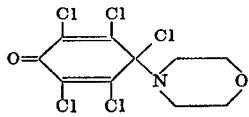

A 17.4 gram portion (0.2 mole) of morpholine was added to a stirred solution of 30.0 grams (0.1 mole) of hexachlorocyclohexa-2,5-diene-1-one in 200 ml. of ether. The reaction mixture was allowed to stir overnight in a 500 ml. flask equipped with mechanical stirrer and reflux condenser. Vacuum filtration and washing with about 25 ml. of ether afforded 31.7 grams of a solid crude product melting at 193°–196.5° C. The resulting solid was slurried with 250 ml. of water, filtered with suction, washed with 100 ml. of water and air dried to yield 29.7 grams (84.5% yield) of a product melting at 198°–200° C. A sample prepared by crystallization from isopropanol three times melted at 198°–199.5° C. and had the following analysis: Calculated for $C_{10}H_8Cl_5NO_2$ (percent): C, 34.3; Cl, 50.5; N, 3.99. Found (percent): C, 34.25; Cl, 49.72; N, 4.16.

The compound thus prepared was tested to determine its effect as a herbicide for post-emergent and pre-emergent application following the procedures outlined in Examples V and VI, respectively. In both of these tests, the compound 4 - N - morpholinopentachlorocyclohexa-2,5-diene-1-one was applied at a rate equivalent to 20 pounds per acre, but there was normal stand or no injury as compared to untreated flats.

A review of the results of the experiments disclosed in Examples V and VI clearly shows that the herbicides of this invention are useful for selectively controlling broad leaf plants. In contradistinction, Example VII shows that the related compound 4-N-morpholinopentachlorocyclohexa-2,5-diene-1-one had no herbicidal effect when it was used for post-emergent or pre-emergent application.

Although this invention has been described in relation to specific embodiments, it will be apparent that obvious modifications may be made by one skilled in the art without departing from the intended scope of this invention.

I claim:

1. A 4 - trialkylammoniumpentachlorocyclohexa - 2,5-diene-1-one chloride.

2. A compound in accordance with claim 1 which is of the formula

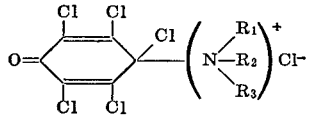

wherein the radicals $R_1$, $R_2$ and $R_3$ are alkyl radicals containing a total of 3 to 15 carbon atoms.

3. A compound in accordance with claim 2 which is 4 - trimethylammoniumpentachlorocyclohexa - 2,5 - diene-1-one chloride.

References Cited

FOREIGN PATENTS 716,020    9/1954    Great Britain.

LORRAINE A. WEINBERGER, Primary Examiner

L. A. THAXTON, Assistant Examiner

U.S. Cl. X.R.

71—121